Jan. 21, 1936.  W. F. HEROLD  2,028,328
EXPANSION INSERT OR CASTER SOCKET FOR TUBULAR LEGS OR THE LIKE
Filed Aug. 18, 1933  2 Sheets-Sheet 1
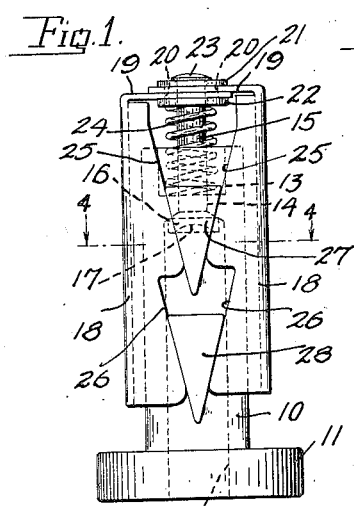
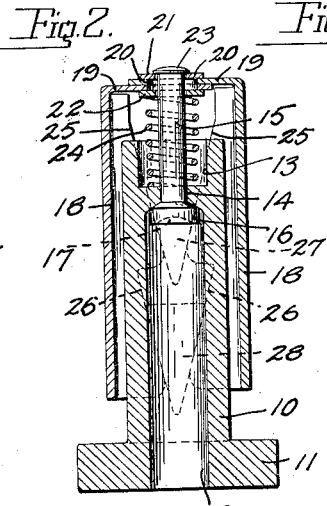
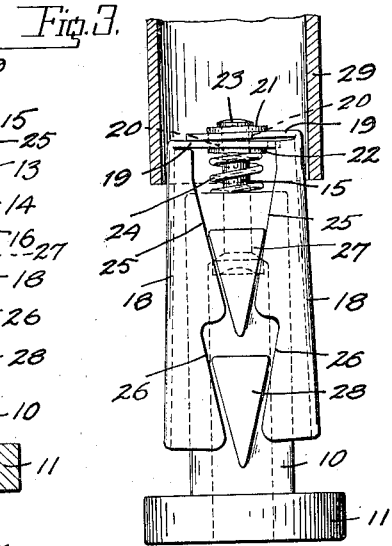
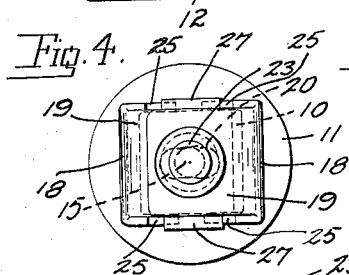
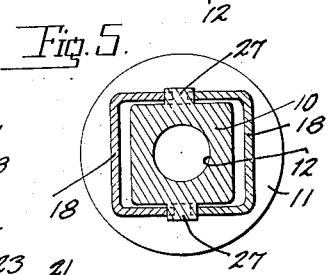
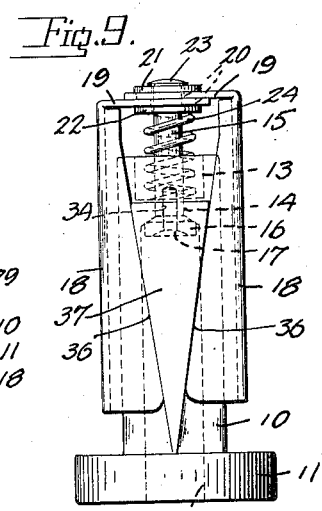
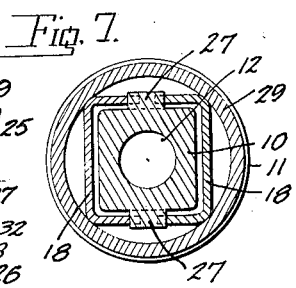
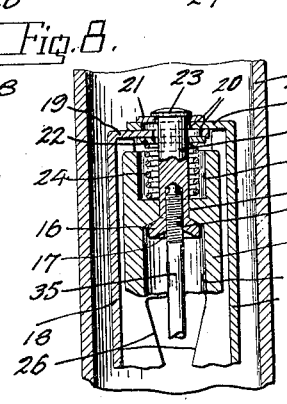
INVENTOR.
WALTER F. HEROLD
BY
ATTORNEY.

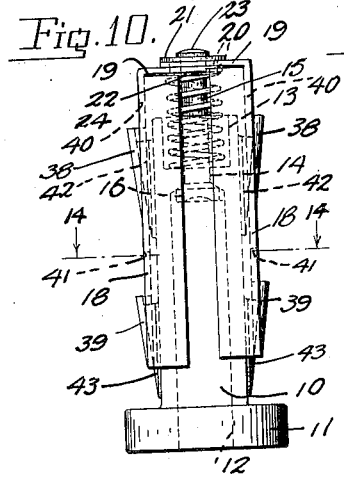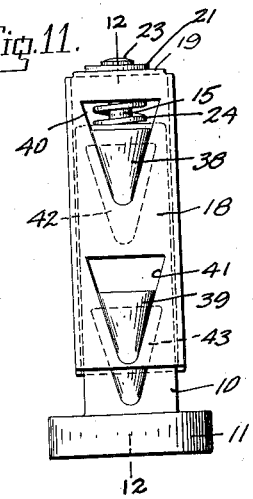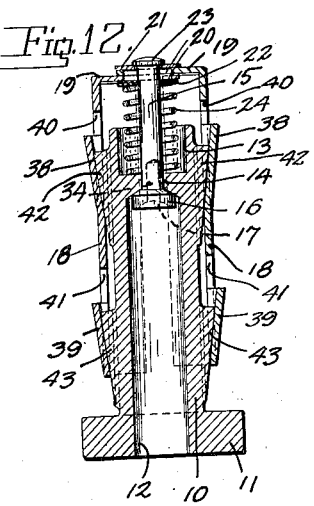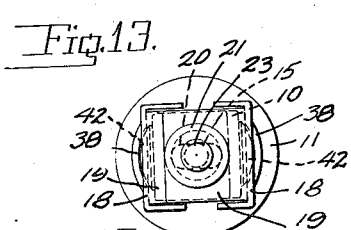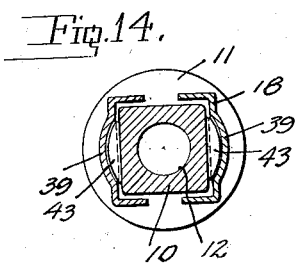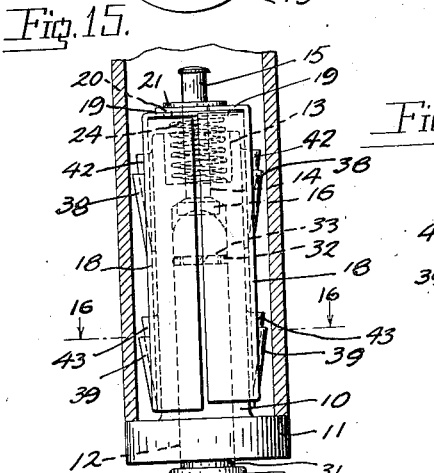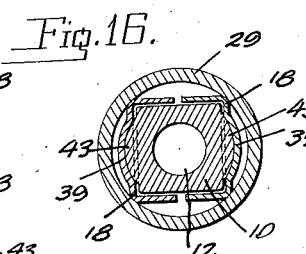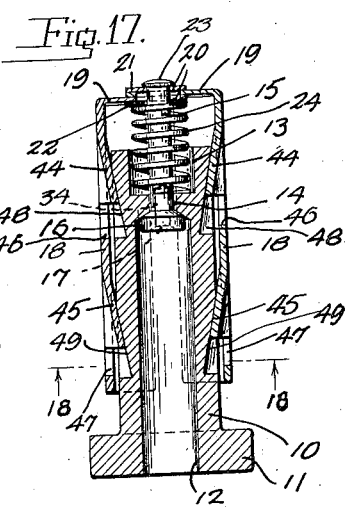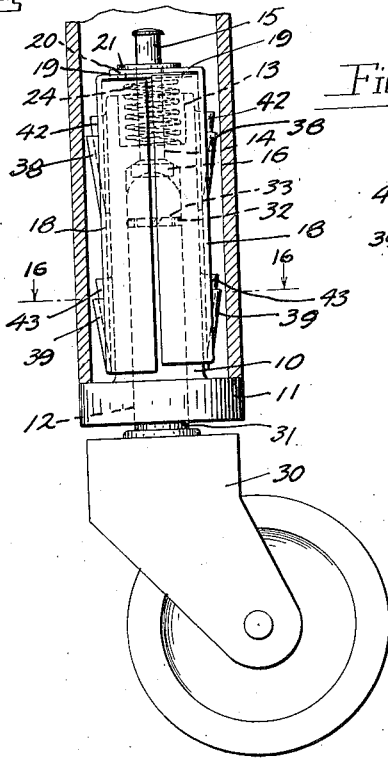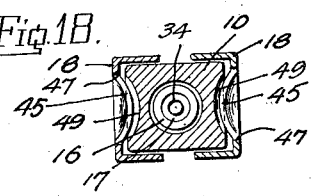

Patented Jan. 21, 1936

2,028,328

UNITED STATES PATENT OFFICE 2,028,328

EXPANSION INSERT OR CASTER SOCKET FOR TUBULAR LEGS OR THE LIKE

Walter F. Herold, Bridgeport, Conn., assignor to The Bassick Company, Bridgeport, Conn., a corporation of Connecticut Application August 18, 1933, Serial No. 685,689

7 Claims. (Cl. 16—39)

The present invention relates to an expansion insert or caster socket for tubular legs or the like, and has for an object to provide such a device which may be easily inserted in a tubular leg or the like and will thereupon be tightly held against removal, without the necessity of employing screw rivets, or other extraneous fastening means. Another object is to provide an insertion device which will be more tightly held when subjected to blows or strains as distinguished from the usual type of socket which tends to loosen when subject to such blows or strains. A further object is to provide a socket which may be inserted and effectually held in legs of varying diameters, such as are usually encountered where large tolerances are permitted.

Another object is to provide a device which cannot be removed from the leg after once inserted, without employing special removal means. A still further object is to provide an insertion which will provide a strengthening plug for the end of the tubular leg, and which may be used as a slide or rest for directly engaging the floor.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a side elevation of a socket according to one exemplary illustrated embodiment of the invention, the same being shown in its detached position.

Fig. 2 is a vertical sectional view.

Fig. 3 is a view showing the tubular leg in section and showing the entering position of the socket as it is inserted in the leg.

Fig. 4 is a top plan view of the socket.

Fig. 5 is a sectional view taken along the line 4—4 of Fig. 1.

Fig. 6 is a view showing the tubular leg in section and showing the socket inserted therein and with the caster in place.

Fig. 7 is a sectional view taken along the line 7—7 of Fig. 6.

Fig. 8 is a fragmentary sectional view of the upper end of the socket in its position in the leg and showing the removal means for disengaging it from the leg.

Fig. 9 is a side elevation of a modified form of the invention.

Fig. 10 is a front elevation of another modified form of the invention.

Fig. 11 is a side elevation thereof.

Fig. 12 is a vertical sectional view, taken along the line 12—12 of Fig. 11.

Fig. 13 is a top plan view.

Fig. 14 is a sectional view, taken along the line 14—14 of Fig. 10.

Fig. 15 is a view showing the socket illustrated in Figs. 10 to 14 inserted in the leg and with the caster in place, the leg being shown in vertical section.

Fig. 16 is a sectional view taken along the line 16—16 of Fig. 15.

Fig. 17 is a vertical sectional view of a further modification of the invention.

Fig. 18 is a sectional view, taken along the line 18—18 of Fig. 17.

Similar reference characters indicate corresponding parts throughout the several figures of the drawings.

Referring to the drawings, and particularly to Figs. 1 to 8 thereof, the expansion insert, according to the exemplary illustrated embodiment of the invention, shown therein, comprises a body 10, preferably in the form of a casting of rectangular cross section, having a circular base flange 11 adapted to engage beneath the lower edge of the leg, and provided with a cylindrical bore 12 for receiving the caster pintle.

In the upper end of the body there is provided a pocket 13 having a central passage 14 in its base communicating with the upper end of the bore 12, and within this passage there is engaged a plunger 15 having a head 16 at its lower end disposed in the upper end of the bore 12, the under surface of said head having a concave recess 17 to provide a top bearing for the caster pintle. The upper end of the plunger projects above the body and has gripping members mounted thereon, as will presently more fully appear.

The gripping members 18—18 are of similar form, and are disposed in embracing relation at opposed sides of the body 10. They are each in the form of a channel, having a transversely bent lip 19 at the upper end provided with a slot 20 engaged with the plunger 15, the lip of one member being overlapped and superimposed with respect to the other and being held upon the plunger between a pair of washers 21 and 22, the upper end of the plunger being headed over, as at 23, above the upper washer 21 and a spring 24 being disposed about the plunger between the lower washer 22 and the base of the socket 13. The slotted engagement of the gripping members with the plunger permits a certain degree of inward and outward movement and also permit a limited tilting movement of the members.

The upright edges of the sides of the gripping members have inclined camming surfaces 25 and 26 found thereon, and these are parallel to and engage the sides of a pair of wedge-shaped upper and lower projections 27 and 28 formed upon opposed sides of the body, the converging ends of the projections being disposed downwardly.

As shown in Figs. 1 and 2, which represent the inoperative detached relation of the socket, the spring 24 presses the gripping members to the upper limit against the head 23 of the plunger, and in this relation the wedge projections 27 and 28 cam the members outwardly from the sides of the body.

When inserting the socket in the leg 29, as shown in Fig. 3, the upper ends of the gripping members may be tilted inwardly to facilitate insertion. Thereupon the socket is pressed into the leg by pressure applied upon the lower flanged end 11 of the body and as the gripping members are contracted to fit within the leg the body moves upwardly relatively to these members. When fully inserted the upward pressure of the spring 24 upon the gripping members causes them through the camming action of the projections 27 and 28 to press outwardly into gripping engagement with the leg. Any attempt to remove the socket by pulling on the flanged end 11 of the body only tends to more firmly press the gripping members against the leg, so that removal in this manner becomes practically impossible. The corners of the gripping members are slightly rounded and they engage along their entire length by an outward pressure of the projections 27 and 28 applied uniformly along the length of the members, so that a positive and firm gripping action over relatively long surfaces results.

The caster 30 may be of any suitable type, and, as shown in the present illustration, is provided with a cylindrical pintle 31 adapted to be inserted in the bore 12 and to have swiveling bearing in the concave recess 17 of the plunger. The caster pintle is removably retained in the socket by means of a split spring ring 32 disposed in an annular groove 33 in the pintle, and which ring frictionally engages the wall of the bore and permits swiveling movement of the caster pintle.

While it is possible to remove the socket by exerting downward pressure upon the upper ends of the gripping members this is impractical in a long leg, or one that is inaccessible from the top. In Fig. 8 I have shown a means for removing the socket from the lower end, and which consists in providing a threaded hole 34 in the lower end of the plunger into which a threaded end rod 35 may be screwed. By pulling downwardly on this rod the gripping members are pulled downwardly relatively to the body to release the gripping action, and the socket may be pulled out.

In Fig. 9 I have shown a modification in which only one inclined surface 36 is provided on the edges of the gripping members and only one wedge projection 37 is provided on the opposed sides of the body.

In Figs. 10 to 16 I have shown a modification in which the edges of the sides of the gripping member 18 are straight and these sides are disposed upon the plane sides of the body 10. While the connecting intermediate portions of said members are provided with upper and lower outwardly embossed tapering pockets 38 and 39, having diverging openings 40 and 41 at their upper ends, and which engage upper and lower edge projections 42 and 43 provided on the opposed sides of the body 10. The surfaces of both the pockets and the projections are transversely curved in substantially concentric relation to the central axis of the body, and the radius of the curve is the same from the top to the bottom, so that in any position of relative movement between the body and gripping members there will be full surface contact. The sides of the gripping members are slightly spaced from the sides of the body so that the members may have a slight lateral swinging movement, insuring a firm engagement of all of the gripping surfaces with the leg even though there be surface irregularities in the latter, or if it be slightly out of round. The manner of inserting and removing and the operation is substantially the same as the first embodiment.

In Figs. 17 and 18 I have shown a further modification in which the arrangement of the camming means is substantially the reverse of the camming means of the embodiment shown in Figs. 10 to 16. In this case the gripping members 18 have upper and lower inwardly embossed tapering projections 44 and 45, the converging ends being uppermost and diverging openings 46 and 47 being provided at the lower ends, and these projections engage upper and lower tapering pockets 48 and 49 formed in the opposed sides of the body. The surfaces of the projections and pockets are transversely curved to permit slight lateral swinging movement and are of equal radius from top to bottom to provide full surface contact in any position of relative adjustment between the gripping members and the body. The manner of inserting and removing and the operation is substantially the same as the other embodiments.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:—

1. An expansion insert for tubular legs or the like, comprising a body, gripping means carried outwardly thereof having longitudinal and lateral movement relative to said body, the entering end of said insert being capable of insertion through the lower open end of the tubular leg, camming means cooperating between said body and gripping means adapted to impart outward lateral movement to the latter as said body and gripping means are moved one relative to the other longitudinally in one direction, said one direction of movement of said body being opposed to the direction of insertion in the tubular leg or the like, and resilient means cooperating between said body and gripping means adapted to move said gripping means relatively to said body in said one direction.

2. An expansion insert for tubular legs or the like, comprising a body, a pair of gripping members carried outwardly thereof, each comprising a vertically disposed portion and a transversely extending portion slidably mounted upon the upper end of said body for longitudinal and lateral movement relative to said body, cooperating camming means carried by said respective body and said gripping means adapted to impart outward lateral movement to the latter as said body and gripping means are moved one relative to the other longitudinally in one direction, and resilient means disposed between said body and said transverse portions of said gripping members adapted to move said gripping members relatively to said body in said one direction.

3. An expansion insert for tubular legs or the like, comprising a body, a pair of gripping members carried outwardly thereof, each comprising a vertically disposed channel portion and a transversely extending portion slidably mounted upon the upper end of said body for longitudinal and lateral movement relative to said body, camming means cooperating between said body and gripping means adapted to impart outward lateral movement to the latter as said body and gripping means are moved one relative to the other longitudinally in one direction, and resilient means disposed between said body and said transverse portion of said gripping members adapted to move said gripping means relatively to said body in said one direction.

4. An expansion insert for tubular legs or the like, comprising a body, a pair of gripping members carried outwardly thereof, each comprising a vertically disposed channel portion and a transversely extending portion slidably mounted upon the upper end of said body for longitudinal and lateral movement relative to said body, camming means cooperating between said body and gripping means disposed respectively as the opposed sides of said body and on the edges of the sides of the channel portions of said gripping members adapted to impart outward lateral movement to the latter as said body and gripping means are moved one relative to the other longitudinally in one direction, and resilient means disposed between said body and said transverse portion of said gripping members adapted to move said gripping means relatively to said body in said one direction.

5. An expansion insert for tubular legs or the like, comprising a body, a pair of gripping members carried outwardly thereof, each comprising a vertically disposed channel portion and a transversely extending portion slidably mounted upon the upper end of said body for longitudinal and lateral movement relative to said body, camming means cooperating between said body and gripping means disposed respectively on the opposed sides of said body and on the intermediate portion of the channel portions of said gripping members adapted to impart outward lateral movement to the latter as said body and gripping means are moved one relative to the other longitudinally in one direction, and resilient means disposed between said body and said transverse portion of said gripping members adapted to move said gripping means relatively to said body in said one direction.

6. An expansion insert for tubular legs or the like, comprising a body, gripping means carried outwardly thereof having longitudinal and lateral movement relative to said body, the entering end of said insert being capable of insertion through the lower open end of the tubular leg, and camming means cooperating between said body and gripping means adapted to impart outward lateral movement to the latter as said body is moved relatively to said gripping means in a direction opposed to the direction of insertion in said tubular leg or the like, and spring means acting between said body and said gripping means normally pressing said body in said direction opposed to the direction of insertion.

7. An expansion insert for tubular legs or the like, comprising a body, gripping means carried outwardly thereof having longitudinal and lateral movement relative to said body, and camming means cooperating between said body and gripping means adapted to impart outward lateral movement to the latter as said gripping means is moved relatively to said body in the direction of insertion in said tubular leg or the like, and spring means acting between said body and said gripping means normally pressing said gripping means in said direction of insertion.

WALTER F. HEROLD.